(12) United States Patent
Lhermite et al.

(10) Patent No.: US 7,447,601 B2
(45) Date of Patent: Nov. 4, 2008

(54) POWER SUPPLY CONTROLLER METHOD AND STRUCTURE

(75) Inventors: Francois Lhermite, Lasserre (FR); Joel Turchi, Toulouse (FR)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 285 days.

(21) Appl. No.: 10/549,543

(22) PCT Filed: Feb. 26, 2004

(86) PCT No.: PCT/US2004/006281

§ 371 (c)(1),
(2), (4) Date: Sep. 19, 2005

(87) PCT Pub. No.: WO2005/093936

PCT Pub. Date: Oct. 6, 2005

(65) Prior Publication Data

US 2006/0290337 A1    Dec. 28, 2006

(51) Int. Cl.
*G01R 21/06* (2006.01)
(52) U.S. Cl. .......................................... 702/60; 702/61
(58) Field of Classification Search .................... 702/60
See application file for complete search history.

(56) References Cited

U.S. PATENT DOCUMENTS

| | | | | |
|---|---|---|---|---|
| 5,134,355 A | | 7/1992 | Hastings | |
| 5,315,533 A | * | 5/1994 | Stich et al. | 700/298 |
| 5,359,281 A | | 10/1994 | Barrow et al. | |
| 5,481,730 A | * | 1/1996 | Brown et al. | 713/340 |
| 5,502,370 A | * | 3/1996 | Hall et al. | 323/284 |
| 5,726,901 A | * | 3/1998 | Brown | 702/61 |
| 5,801,522 A | * | 9/1998 | McKenzie | 323/303 |
| 5,859,768 A | * | 1/1999 | Hall et al. | 363/21.13 |
| 6,144,187 A | * | 11/2000 | Bryson | 320/137 |
| 6,229,681 B1 | * | 5/2001 | Lee | 361/92 |
| 6,252,783 B1 | * | 6/2001 | Huh et al. | 363/21.01 |
| 6,269,012 B1 | * | 7/2001 | Kusakabe et al. | 363/84 |
| 6,574,124 B2 | * | 6/2003 | Lin et al. | 363/65 |
| 2002/0071301 A1 | * | 6/2002 | Kinghorn | 363/125 |
| 2003/0014200 A1 | * | 1/2003 | Jonker et al. | 702/60 |

OTHER PUBLICATIONS

Data Sheet, NCP1650 Power Factor Controller, Aug. 2003—Rev. 8, Semiconductor Components Industries, LLC, pp. 1-31.
Data Sheet, AND8106/D 100Watt, Universal Input, PFC Converter, Feb. 2003—Rev. 2, Semiconductor Components Industries, LLC, pp. 1-7.

* cited by examiner

*Primary Examiner*—Bryan Bui
*Assistant Examiner*—Jonathan Teixeira Moffat
(74) *Attorney, Agent, or Firm*—Robert F. Hightower

(57) ABSTRACT

A power supply controller determines the value of an input power and uses the value of the input power to regulate a value of the output voltage.

15 Claims, 3 Drawing Sheets

POWER SUPPLY CONTROLLER METHOD AND STRUCTURE

BACKGROUND OF THE INVENTION

The present invention relates, in general, to electronics, and more particularly, to methods of forming semiconductor devices and structure.

In the past, the semiconductor industry utilized various methods and structures to produce power supply controllers. Typically, the power supply controllers utilized either a voltage mode or a current mode regulation technique to regulate the value of an output voltage. A voltage mode controller utilized the value of the output voltage as a feedback signal to regulate the value of the output voltage. A current mode controller utilized both the output voltage and the value of a switch current flowing through a switching transistor in order to regulate the value of the output voltage. One example of such a current mode controller is disclosed in U.S. Pat. No. 6,252,783 issued to Dong-Young Huh on Jun. 26, 2001.

When the value of the output voltage decreased, such as due to an increase in load current, the controller increases the switch current in order to increase the load current. In some cases, for example a short on the output, the controller increased the load current to a value that resulted in damage to the controller and the power supply system.

Accordingly, it is desirable to have a power supply controller that prevents damaging the controller under large load conditions.

BRIEF DESCRIPTION OF THE DRAWINGS

For simplicity and clarity of illustration, elements in the figures are not necessarily to scale, and the same reference numbers in different figures denote the same elements. Additionally, descriptions and details of well-known steps and elements are omitted for simplicity of the description.

DETAILED DESCRIPTION OF THE DRAWINGS

Figure 1:
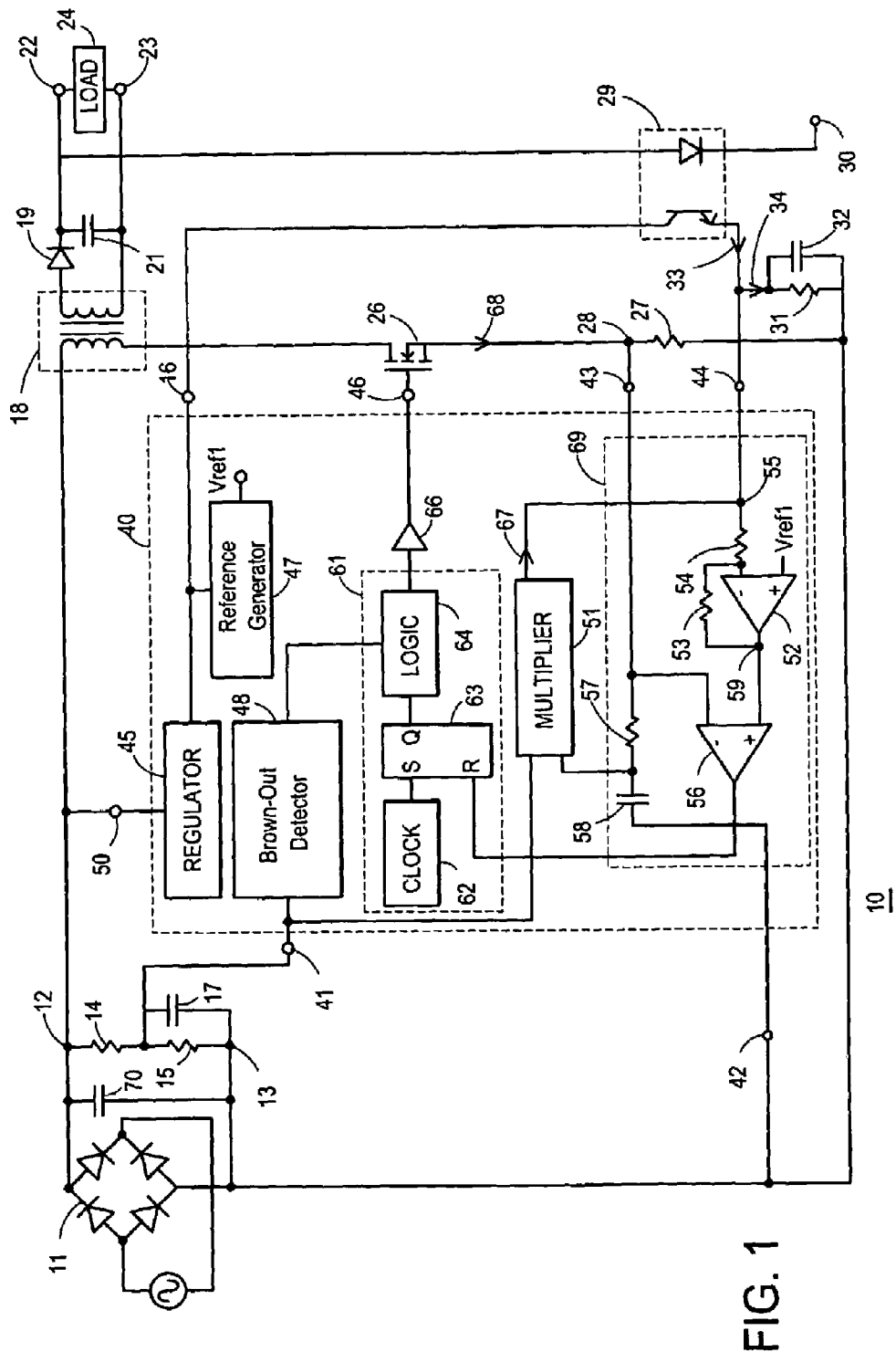
FIG. 1 schematically illustrates a portion of an embodiment of a power system having an embodiment of a power supply controller in accordance with the present invention.

FIG. 1 schematically illustrates a portion of an embodiment of a power supply system 10 that includes an embodiment of a power supply controller 40 that uses the input power to system 10 in order to regulate the output voltage of system 10 and prevent damage to both controller 40 and system 10. Other components typically are connected externally to controller 40 in order to provide functionality for system 10. For example a bridge rectifier 11 which receives a source voltage from an AC source such as a household mains, an energy storage capacitors 17 and 70, a voltage divider including resistors 14 and 15 connected in series and coupled across rectifier 11, a transformer 18, a blocking diode 19, an output storage capacitor 21, an output transistor or switch transistor 26, a feedback network 29, and a current sense resistor 27 typically are connected externally to controller 40. Rectifier 11 forms a bulk voltage between connections 12 and 13 of rectifier 11 that typically is filtered by a capacitor 70 to a substantially dc waveform. Resistors 14 and 15 divide the bulk voltage formed between connections 12 and 13 down to an input voltage that is usable by controller 40. The input voltage received on input 41 typically is representative of the bulk input voltage to system 10. Controller 40 receives the input voltage and uses it for control functions performed by controller 40. The values of resistors 14 and 15 usually are selected to provide the desired functions and may also be selected to set a voltage level for brown-out detection as explained further hereinafter. Controller 40 receives the bulk input voltage as a supply voltage between a supply input 50 and a voltage return 42, and system 10 provides an output voltage between outputs 22 and 23. Controller 40 uses the supply voltage received between supply input 50 and return 42 to provide an internal operating voltage for controller 40. A load 24 typically is connected between outputs 22 and 23 to receive a load current from system 10 in addition to the output voltage.

Transistor 26 typically is a switching power transistor that is connected in series between one leg of the primary of transformer 18 and resistor 27. Controller 40 has an output 46 that is connected to drive transistor 26. Current sense resistor 27 is connected in series between transistor 26 and return 42 to provide a current sense (CS) signal at a node 28. The CS signal is a voltage that is representative of a switch current 68 that flows through transistor 26, thus, representative of the input current to system 10. The current sense (CS) signal is received by controller 40 on a current sense (CS) input 43. Feedback network 29 typically is an optical coupler that provides a feedback (FB) current 33 that is representative of the output voltage between outputs 22 and 23. The optical coupler typically has a light emitting diode connected between output 22 and a reference connection 30. A reference voltage generally is applied to connection 30 so that the value of the reference voltage plus the voltage drop across the light emitting diode of network 29 is approximately equal to the desired output voltage between outputs 22 and 23. For example, a zener diode may be connected between connection 30 and output 23 to provide the desired reference voltage. The optical coupler also has an optical transistor having an emitter coupled to a feedback (FB) input 44 of controller 40 and a collector connected to a voltage terminal 16 of controller 40. Feedback network 29 may also be one of a variety of well-known feedback circuits including series connected resistors. Transformer 18, capacitor 21, capacitor 70, diode 19, rectifier 11, capacitor 17, and resistors 14 and 15 are shown to assist in describing the operation of controller 40. In most embodiments, network 29, transistor 26, transformer 18, capacitor 21, and diode 19 are external to the semiconductor die on which controller 40 is formed, although in some embodiments either or both of transistor 26 and resistor 27 may be included within controller 40.

Controller 40 includes a pulse width modulated (PWM) controller or PWM 61, a reference generator or reference 47, an internal regulator 45, a multiplier 51, and an error block 69 that includes an error amplifier 52 and a current sense (CS) comparator 56. Controller 40 typically includes a driver 66 and may also include other circuits to provide additional functionality to controller 40 such as brown-out detector 48, and other well known circuitry that is not shown such as under-voltage lock-out (UVLO), leading edge blanking, soft-start, and over-voltage protection. Regulator 45 receives the supply voltage from supply input 50 and provides an internal operating voltage for the elements within controller 40 including reference 47, detector 48, PWM 61, multiplier 51, amplifier 52, and comparator 56. Although not shown for simplicity of the drawings, regulator 45 is connected between input 50 and return 42 to receive the voltage applied to input 50. Regulator 45 also has a voltage output that is connected to voltage terminal 16 in order to provide the internal operating voltage for controller 40 and for circuits external to controller 40. Reference 47 generates a voltage reference signal Vref1 that is used by amplifier 52 and may also be used elsewhere within controller 40. PWM 61 includes a clock generator or clock 62 that provides clock signals at a periodic rate, a reset dominant RS/latch 63, and control logic 64 that typically is used to modified the PWM drive signals based on other control logic such as detector 48. In most embodiments, amplifier 52 and comparator 56 are regarded as a portion of PWM 61. Clock 62 provides periodic clock pulses on an output 60 that are used to set latch 63 and form a leading edge of drive pulses applied to the gate of transistor 26 in order to turn-on or enable transistor 26. Turning-on transistor forms current 68 flowing through transistor 26 and resistor 27, and to forms the load current to load 24 and to charge capacitor 21. Latch 63 is reset to form the trailing edge of the drive pulses by the output of comparator 56 being driven to a logic high.

Controller 40 is formed to use the input voltage on input 41 and the CS signal on input 43 to calculate the instantaneous value of the input power to system 10, and to use the FB signal and the average value of the system input power to regulate the value of the output voltage on outputs 22 and 23 to a desired operating value. For example, if the desired normal operating value is 3.5 volts, controller 40 uses the input power to regulate the output voltage to approximately 3.5 volts. The value of the output voltage generally is regulated to within plus or minus ten per cent (10%) of the desired value. As will be seen hereinafter, controller 40 uses the input power to assist in modulating the duty cycle of the drive pulses that are formed by PWM 61 and used to drive transistor 26. When a clock edge from clock 62 sets latch 63, controller 40 enables transistor 26 and switch current 68 flows through both transistor 26 and resistor 27 and forms the CS signal. Multiplier 51 receives the input voltage and the CS signal and responsively multiplies the two signals together to form a power sense signal as a current 67 that is representative of the instantaneous input power to system 10. Feedback network 29 generates FB current 33. Currents 33 and 67 are summed together at a node 55 to form a power FB control current 34 that is converted to a power FB control voltage by a resistor 31 and a capacitor 32. The power FB control voltage across resistor 31 represents a sum of a signal representative of the input power added to a quantity that is representative of the difference between a desired output voltage and the actual output voltage. The power FB control voltage is received by error amplifier 52 which responsively generates an error signal on an output 59. Consequently, the value of the error signal also is representative of the amount of input power required to maintain the output voltage substantially constant. Resistors 53 and 54 are used to set the gain of amplifier 52. Comparator 56 receives the error voltage and the CS signal and responsively compares the CS signal to the error signal in order to determine the appropriate value of current 68 at which to reset latch 63. Resetting latch 63 terminates the current drive pulse to transistor 26. Those skilled in the art will realize that since system 10 is operating in a mode typically referred to as discontinuous current operation, current 67 has a triangular waveshape. In other embodiments where system 10 operates in the mode typically referred to as the continuous current mode, current 67 would have a trapezoidal wave shape. Both the discontinuous and continuous current operational modes are well known to those skilled in the art. The filter of resistor 31 and capacitor 32 integrates the triangular waveform of current 67 to provide an average value of the power represented by current 67. The filter also integrates instantaneous changes in current 33 to provide an average value of the voltage represented by current 33. The time constant of the filter typically ranges between ten and one hundred (10-100) micro-seconds.

When load 24 requires an increase in load current, the output voltage between outputs 22 and 23 decreases causing a corresponding decrease in current 33. The change in the output voltage represents a transition from the condition of the desired steady state output voltage value or first value to another steady state regulated voltage condition. Note that the power FB control voltage at input 44 also is at a first steady state value or first value when the output voltage is at the first value, and that the value of the power FB control voltage changes when current 33 changes, however, such change may be small. Those skilled in the art understand that completing such a transition from one steady state condition to another steady state condition may require several cycles to complete. The below description shortens the number of cycles for clarity of the description. The filter of resistor 31 and a capacitor 32 integrates the change in current 33 to form the average value of the change in voltage which causes the value of the power FB control voltage applied to amplifier 52 to decrease from the first value to a second value. The decreased second value of the power FB control voltage is received by amplifier 52. Since amplifier 52 is inverting, the voltage on output 59 increases from a first voltage to a second voltage. Amplifier 52 has a high gain, thus, a small change in the value of the voltage received by amplifier 52 results in a large change in the voltage on output 59 and a corresponding large change in current 68. In the preferred embodiment, amplifier 52 has a gain of about ten (10). When clock 62 sets latch 63, the corresponding current sense signal at input 43 is received by multiplier 51 and comparator 56. As noted previously, several cycles of such changes may be required to complete the transition between stable steady state conditions. The increased second voltage value of output 59 requires current 68 and the CS signal to increase in value before the output of comparator 56 goes high to reset latch 63. The increased value of current 68 moves the output voltage to a second steady state value that is close to the first one. As the value of current 68 and the CS signal increase, the value of current 67 also increases. The increase in current 67 sums with the decrease in current 33 to form a second steady state value for the power FB control voltage. Consequently, summing currents 33 and 67 regulates the output voltage to the desired output voltage value while controlling the amount of input power transferred to the output. As noted hereinbefore, controller 40 regulates the output voltage to a value that typically is substantially constant to within plus or minus ten per cent (10%) of the desired output voltage value. Consequently, the voltage on input 44 is also regulated to a value that is substantially constant to within plus or minus ten per cent (10%) of the value of Vref1. The increase in current 68 increases the load current in order to provide the required increased load current to load 24 and to keep capacitor 21 charged to the desired output voltage to maintain regulation of the output voltage.

As indicated hereinbefore, current 68 typically has a triangular or ramp shape, thus, current 67 also has a ramp shape. The filter of resistor 31 and capacitor 32 integrate it to provide a voltage that is representative of the average value of the input power. The values of resistors 27 and 31 are also chosen to set the maximum input power for system 10. Resistor 57 and capacitor 58 are optional and assist in isolating the input to multiplier 51 to improve operation thereof. Resistor 57 and capacitor 58 also provide additional integration of the pulse of current 68.

For a decrease in the load current, the same operations occur but with opposite polarity. As with the description of an increase in load current, the transition from one stable regulated state to another stable regulated state may occur over several cycles, however, the following explanation shortens the number of cycles for clarity of the description. The output voltage and current 33 increase causing the output of amplifier 52 to decrease. The subsequent drive pulses to transistor 26 are narrower due to the decrease in output 59 causing the corresponding pulses of current 68 to have a shorter duration and a lower amplitude. Current 67 decreases and sums with the increase in current 33 to form a second steady state value for the power FB control voltage and to control the amount of input power transferred to the output.

The same type of regulation occurs if the bulk voltage formed between connections 12 and 13 changes while the voltage and current required by load 24 remains constant. If the bulk voltage increases or decreases, current 67 respectively decreases or increases and sums with current 33 to form a current 34 that respectively decreases or increases. Controller 40 responsively changes current 68 as described hereinbefore to regulate the output voltage.

In the case of an overload condition on outputs 22 and 23, current 33 decreases to almost zero. The resulting value of output 59 increases significantly causing the next pulse of current 68 to have a much larger duration and amplitude until the CS signal equals the value on output 59. The increase in the CS signal increases the value of current 67 which sums with the decrease in current 33 to keep capacitor 32 charged and to move output 59 back toward the previous value keeping the value of output 59 substantially constant. The amount of energy delivered by the increase in current 68 is not sufficient to maintain regulation of the output voltage and the value of the output voltage decreases. However, the power delivered to load 24, thus the input power, remains substantially constant even though there is a short between outputs 22 and 23. Keeping the power substantially constant prevents damaging controller 40 and other components of system 10. For the case of an open circuit between outputs 22 and 23, the opposite occurs, that is, current 33 increases and current 67 substantially goes to zero. Controller 40 receives the increase in the value of the voltage at input 44 and uses the input power to keep the output voltage substantially constant.

In order to facilitate this operation, a voltage input of regulator 45 is connected to input 50 and a voltage return of regulator 45 is connected to return 42. A Vref1 output of reference 47 is connected to a non-inverting input of amplifier 52. An inverting input of amplifier 52 is commonly connected to a first terminal of resistor 53 and a first terminal of resistor 54. A second terminal of resistor 53 is connected to output 59 of amplifier 52 and to a non-inverting input of comparator 56. An inverting input of comparator 56 is connected to input 43 and to a first terminal of resistor 57, and an output of comparator 56 is connected to the reset input of latch 63. An output of latch 63 is connected to an input of logic 64. A set input of latch 63 is connected to an output of clock 62. An output of logic 64 is connected to an input of driver 66. An output driver 66 is connected to output 46. A first input of multiplier 51 is connected to input 41 and a second input of multiplier 51 is commonly connected to a second terminal of resistor 57 and a first terminal of capacitor 58. A second terminal of capacitor 58 is connected to return 42. An output of multiplier 51 is commonly connected to the second terminal of resistor 54 and to input 44.

Figure 2:
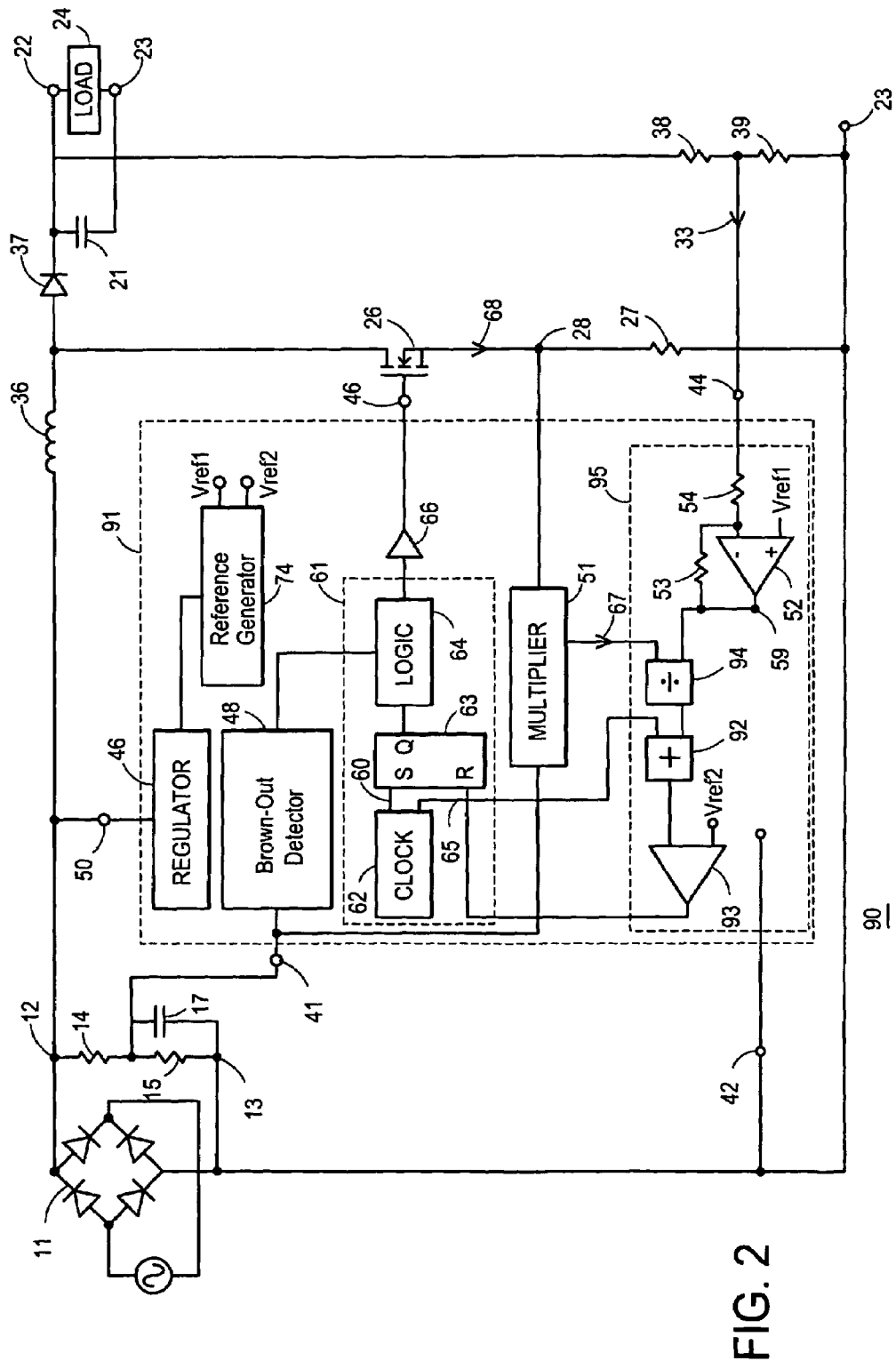
FIG. 2 schematically illustrates a portion of embodiment of a another power supply system having an alternate embodiment of the power supply controller of FIG. 1 in accordance with the present invention.

FIG. 2 schematically illustrates a portion of an embodiment of a power supply system 90 that includes a power supply controller 91 that is an alternate embodiment of controller 40 that is described in the description of FIG. 1. System 90 is configured as a boost converter and includes an input inductor 36, a blocking diode 37, and resistors 38 and 39 connected to provide FB current 33 and the corresponding feedback voltage. The operation of controller 91 and system 90 is similar to the description of system 10. However, system 90 operates in a continuous conduction mode. The bulk voltage between connections 12 and 13 is not filtered, thus, the bulk voltage has a haversine waveform. Current 68 has a waveform that is a haversine envelope modulated with the ramp waveform formed by the enabling and disabling of transistor 26. Consequently, current 67 has a waveform that is the same waveshape as current 68. Since this is a continuous conduction mode, the ramp waveform rides on top of the haversine waveform. Also note that in this embodiment, clock 62 has an additional ramp output 65 and that generator 74 has an additional voltage reference signal (Vref2) on an output Vref2.

Controller 91 includes an error block 95 that has amplifier 52, a divider 94, an adder 92, and a comparator 93. The power FB control voltage received on input 44, thus the output of amplifier 52, is representative of the output voltage and follows the increase or decrease of the output voltage. Divider 94 divides the input power by the output voltage to form a signal representative of the change in input power that is required for a change in output voltage. If the output voltage decreases, for example as a result of an increase in load current, the voltage on input 44 decreases, thus, the output of divider 94 decreases representing a need for increased input power. Conversely, an increase in the output voltage results in an increase in the output of divider 94. Adder 92 adds the ramp from clock 62 to the output of divider 94 to form a signal for modulating the duty cycle of transistor 26. Comparator 93 compares the output of adder 92 to reference voltage Vref2 to set the voltage level of the adder output at which transistor 26 will switch.

Figure 3:
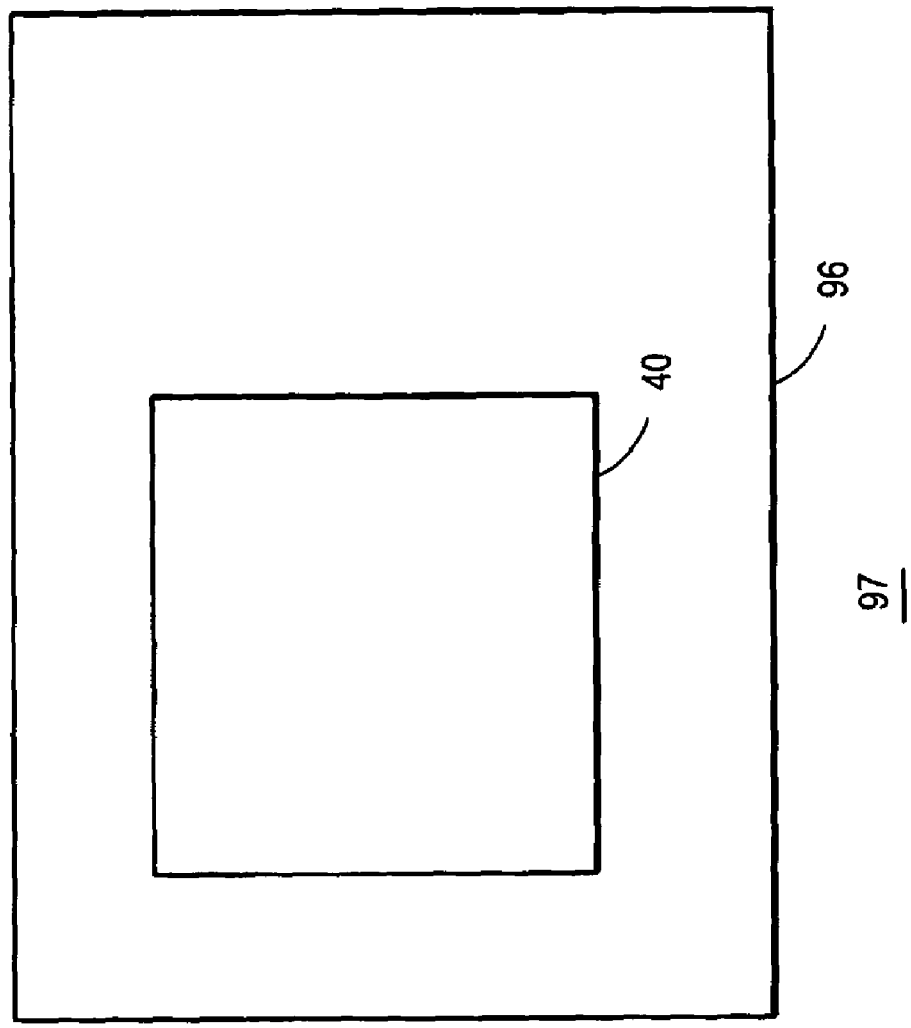
FIG. 3 schematically illustrates an enlarged plan view of an embodiment of a semiconductor device incorporating the power supply controller in accordance with the present invention.

FIG. 3 schematically illustrates an enlarged plan view of a portion of an embodiment of a semiconductor device 97 that is formed on a semiconductor die 96. Controller 40 is formed on die 96. Die 96 may also include other circuits that are not shown in FIG. 3 for simplicity of the drawing. Controller 40 and device 97 are formed on die 96 by semiconductor manufacturing techniques that are well know to those skilled in the art.

In view of all of the above, it is evident that a novel device and method is disclosed. Included, among other features, is using the value of the input power to regulate the value of the output voltage to a desired output voltage value. Using the value of the input power to regulate the output voltage facilitates detecting a change in the bulk input voltage and changing the duty cycle to maintain a substantially constant output voltage. Additionally, using the input power also facilitates maintaining a substantially constant input power during overload conditions thereby protecting the system and controller 40 from damage. Summing the value of the feedback current and the multiplier current facilitates using a single pin of a semiconductor package to form the feedback signal for the power supply controller. Using the input voltage for both the input voltage and for brown-out detection also reduces the number of pins used on the semiconductor package.

While the invention is described with specific preferred embodiments, it is evident that many alternatives and variations will be apparent to those skilled in the semiconductor arts. For example multiplier 51 can be formed to have current inputs instead of voltage inputs, and the output of multiplier 51 can be a voltage instead of a current. Additionally, multiplier 51 may be formed from a variety of implementations that are well known to those skilled in the art.

The invention claimed is:

1. A method of operating a power supply system comprising:
   calculating an input power of a power supply system including generating a power signal that is representative of the input power and summing the power signal with a feedback signal that is representative of the output voltage; and
   using the input power to regulate an output voltage of the power supply system to a desired value.

2. The method of claim 1 wherein using the input power to regulate the output voltage includes using the input power to modulate drive pulses to a power switch of the power supply system.

3. The method of claim 1 further including using a signal representative of an input voltage for brown-out detection.

4. A method of forming a power supply controller:
   coupling the power supply controller to receive a first signal representative of an input voltage and a second signal representative of an input current and responsively form a power signal representative of an input power;
   coupling the power supply controller to receive a feedback signal representative of an output voltage; and
   coupling the power supply controller to form drive pulses to regulate the output voltage responsively to the power signal and the feedback signal including coupling the power supply controller to sum the feedback signal with the power signal to form a power feedback control signal and further including coupling an error amplifier to receive the power feedback control signal and responsively form an error signal and also includes coupling a comparator to receive the error signal and the second signal to modulate a duty cycle of the drive pulses.

5. The method of claim 4 wherein coupling the power supply controller to receive the first signal representative of the input voltage and the second signal representative of the input current and responsively form the power signal includes coupling a multiplier to receive the first signal and the second signal and responsively form the power signal.

6. The method of claim 4 wherein coupling the power supply controller to form drive pulses to regulate the output voltage responsively to the power signal and the feedback signal includes coupling the power supply controller to regulate the output voltage within at least plus or minus ten per cent of a desired value.

7. The method of claim 4 wherein coupling the power supply controller to receive the first signal representative of the input voltage and the second signal representative of the input current and responsively form the power signal includes coupling a brown-out detection circuit of the power supply controller to receive the first signal.

8. The method of claim 4 wherein coupling the power supply controller to receive the first signal representative of the input voltage and the second signal representative of the input current and responsively form the power signal includes coupling the power supply controller signal to responsively form the power signal having a haversine waveform.

9. The method of claim 4 wherein coupling the power supply controller to form drive pulses to regulate the output voltage responsively to the power signal and the feedback signal includes coupling the power supply controller to maintain input power substantially constant during an overload condition.

10. A method of forming a power supply controller:
    coupling the power supply controller to receive a first signal representative of an input voltage and a second signal representative of an input current and responsively form a power signal representative of an input power;
    coupling the power supply controller to receive a feedback signal representative of an output voltage; and
    coupling the power supply controller to form drive pulses to regulate the output voltage responsively to the power signal and the feedback signal including coupling the power supply controller to divide the power signal by the feedback signal.

11. A power supply controller comprising:
    a multiplier coupled to receive a voltage representative of an input voltage and receive a current sense signal representative of an input current and responsively form a power signal representative of an input power;
    a PWM controller of the power supply controller coupled to form drive pulses to regulate an output voltage; and
    an error block of the power supply controller coupled to receive the power signal, a feedback signal, and the current sense signal and responsively control the PWM controller to form the drive pulses wherein an input of the power supply controller is coupled to sum the power signal and the feedback signal.

12. The power supply controller of claim 11 further including a brown-out detector coupled to receive the voltage representative of the input voltage.

13. The power supply controller of claim 11 wherein the error block of the power supply controller coupled to receive the power signal, the feedback signal, and the current sense signal includes an amplifier coupled to receive the power signal and the feedback signal and responsively form a voltage on an output of the amplifier.

14. The power supply controller of claim 13 further including a comparator coupled to receive the current sense signal and the voltage on the output of the amplifier and modulate a duty cycle of the drive pulses.

15. The power supply controller of claim 11 wherein the error block of the power supply controller coupled to receive the power signal, the feedback signal, and the current sense signal includes an amplifier coupled to receive the feedback signal and responsively form an output, and also includes a divider coupled to divide the power signal by the output of the amplifier.

* * * * *